US008581725B2

(12) United States Patent
Goldenberg

(10) Patent No.: US 8,581,725 B2
(45) Date of Patent: Nov. 12, 2013

(54) POSITION CHANGE SENSING ANTI-THEFT DEVICE

(76) Inventor: Lior Goldenberg, Holon (IL)

(*) Notice: Subject to any disclaimer, the term of this patent is extended or adjusted under 35 U.S.C. 154(b) by 706 days.

(21) Appl. No.: 12/717,745

(22) Filed: Mar. 4, 2010

(65) Prior Publication Data

US 2011/0215926 A1  Sep. 8, 2011

(51) Int. Cl.
*G08B 13/14* (2006.01)
(52) U.S. Cl.
USPC .......... 340/568.1; 340/539.1; 340/571; 367/93
(58) Field of Classification Search
USPC ......... 340/568.1, 571, 539.1, 539.32; 367/93, 367/94
See application file for complete search history.

(56) References Cited

U.S. PATENT DOCUMENTS

| | | | |
|---|---|---|---|
| 3,736,584 A | 5/1973 | Hackett et al. | |
| 4,382,291 A | 5/1983 | Nakauchi | |
| 4,499,564 A | 2/1985 | Sirai | |
| 4,656,458 A | 4/1987 | Iwata | |
| 4,684,928 A | 8/1987 | Takahashi et al. | |
| 5,920,521 A * | 7/1999 | Kromer et al. | 367/93 |
| 5,973,996 A | 10/1999 | Zhevelev et al. | |
| 6,133,830 A | 10/2000 | D'Angelo et al. | |
| 7,218,226 B2 * | 5/2007 | Wehrenberg | 340/571 |
| 7,305,714 B2 | 12/2007 | Hamaguchi et al. | |
| 2005/0134431 A1* | 6/2005 | Perez-Garcia et al. | 340/539.23 |
| 2005/0242951 A1* | 11/2005 | Simonazzi | 367/93 |

* cited by examiner

*Primary Examiner* — Thomas Mullen
(74) *Attorney, Agent, or Firm* — Sughrue Mion, PLLC

(57) ABSTRACT

Position change sensing apparatus including at least one audio signal transducer for emitting audio signals and receiving audio signals and computer software embodied in a medium readable by the apparatus and having anti-theft functionality including learning functionality and theft-prevention functionality.

20 Claims, 6 Drawing Sheets

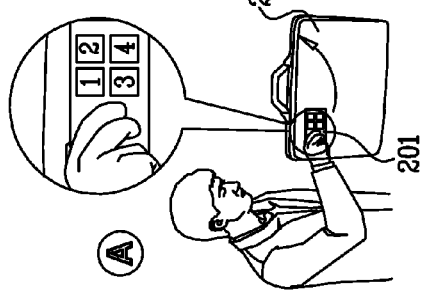
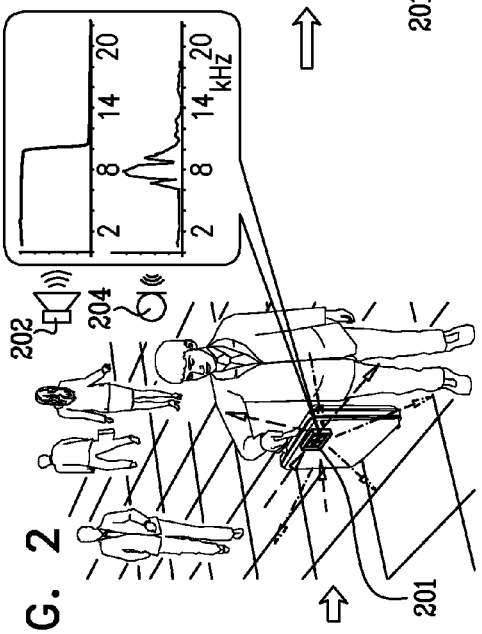
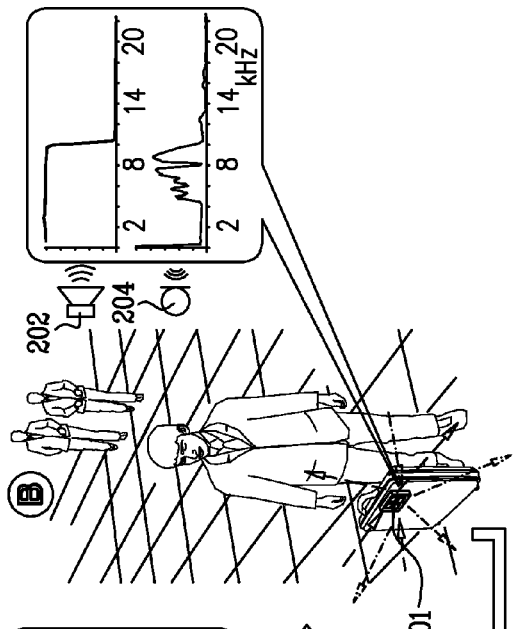
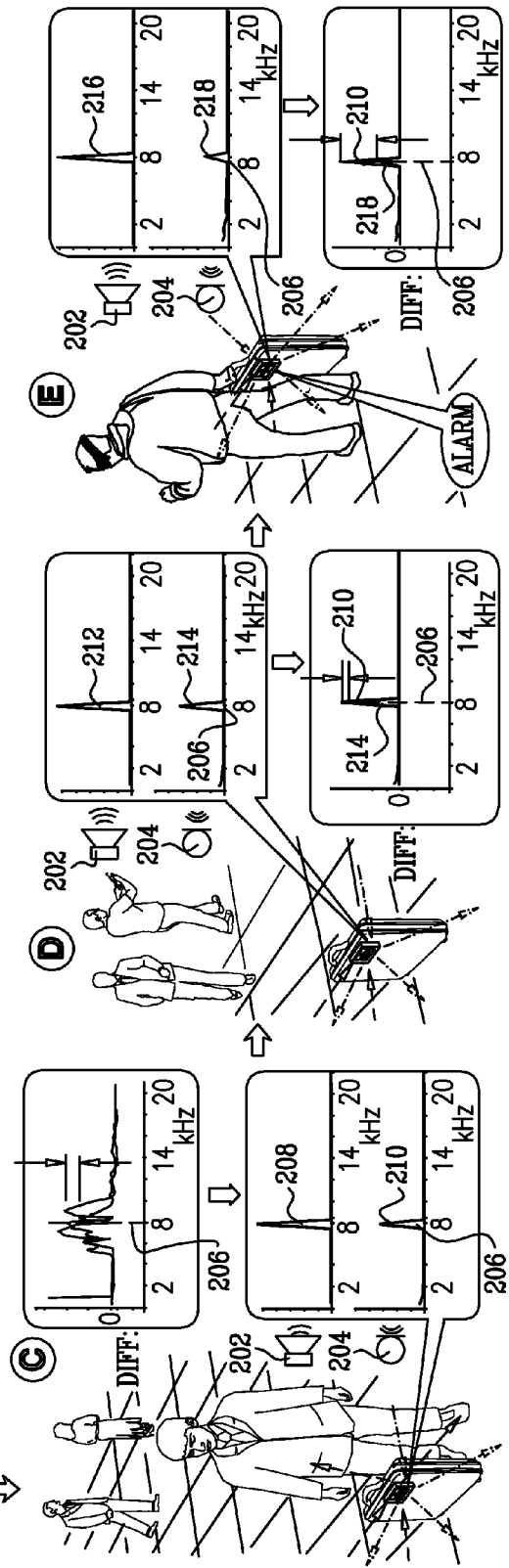
FIG. 2

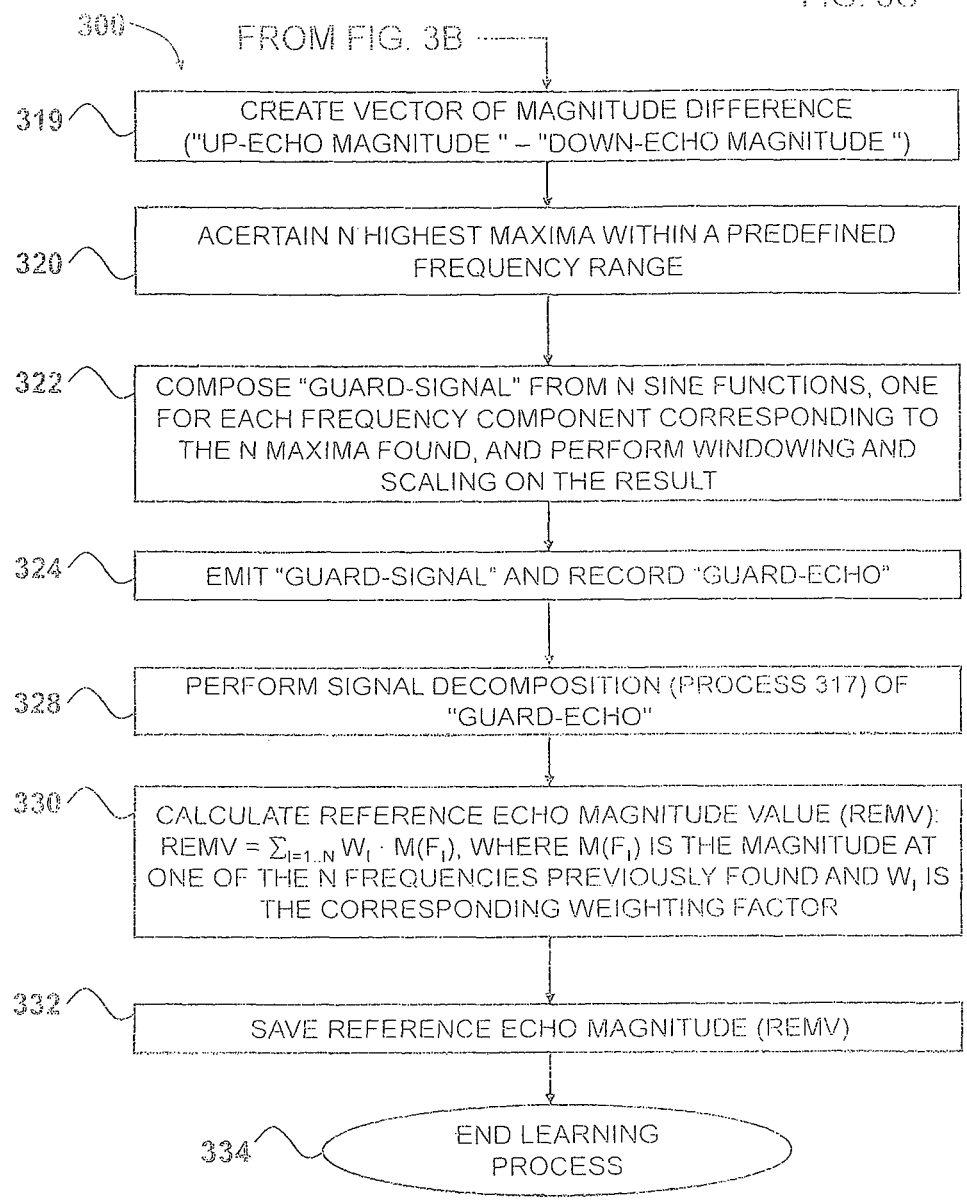

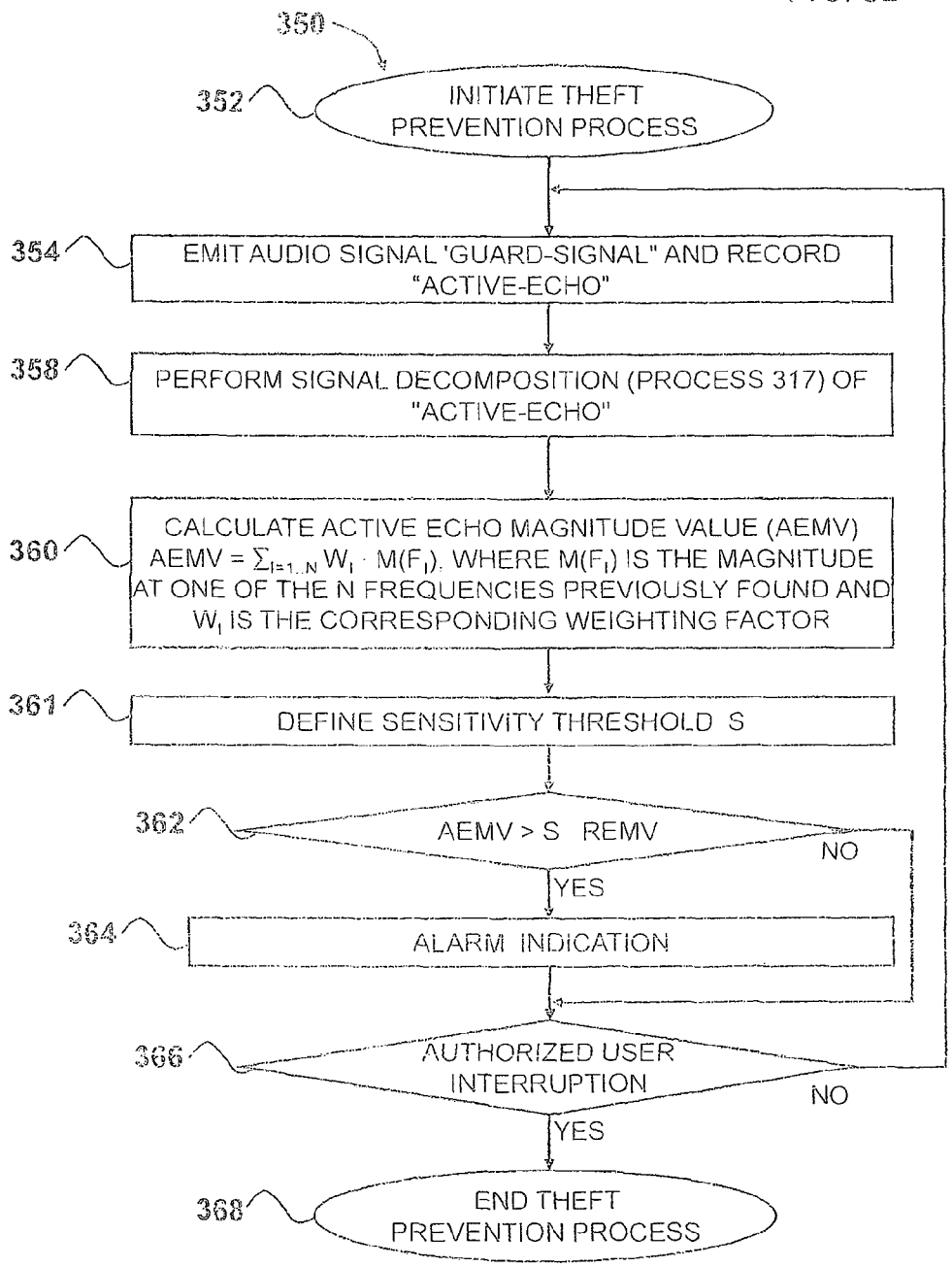

POSITION CHANGE SENSING ANTI-THEFT DEVICE

FIELD OF THE INVENTION

The present invention relates to portable electronic devices generally and more particularly to portable electronic devices having anti-theft functionality and to computer software useful in portable electronic devices for providing such anti-theft functionality.

BACKGROUND OF THE INVENTION

The following U.S. patent publications are believed to represent the current state of the art: U.S. Pat. Nos. 3,736,584; 4,382,291; 4,499,564; 4,684,928; 4,656,458; 5,973,996; 6,133,830 & 7,305,714.

SUMMARY OF THE INVENTION

The present invention seeks to provide portable electronic devices having anti-theft functionality as well as computer software providing anti-theft functionality for such devices.

There is thus provided in accordance with a preferred embodiment of the present invention position change sensing apparatus including at least one audio signal transducer for emitting audio signals and receiving audio signals and computer software embodied in a medium readable by the apparatus and having anti-theft functionality including learning functionality and theft-prevention functionality.

The learning functionality is operative to employ the at least one audio signal transducer to emit an audio signal and to receive an echo of the audio signal in a first mode of operation when the apparatus is not supported on a support surface, to employ the at least one audio signal transducer to emit an audio signal and to receive an echo of the audio signal in a second mode of operation when the apparatus is supported on the support surface, to perform a learning analysis of differences in magnitudes between the echoes and ascertains, based on the learning analysis, at least one frequency at which the difference in magnitudes between the echoes of the first and second modes of operation is significant and to employ the at least one audio signal transducer to emit an audio signal at the at least one frequency at which the difference in magnitudes between the echoes of the first and second modes of operation is significant and to receive an echo of the audio signal at the at least one frequency where the echo is a reference echo.

The theft-prevention functionality is operative to cause the apparatus to employ the at least one audio signal transducer to repeatedly emit an audio signal at the at least one frequency at which the difference in magnitude between the echoes of the first and second modes of operation is significant and to receive an echo of the audio signal at the at least one frequency, repeatedly to perform a theft-prevention analysis of the difference in magnitudes between the echo and the reference echo at the at least one frequency at which the difference in magnitudes between the echoes of the first and second modes of operation is significant, to ascertain, based on the theft-prevention analysis, when the position of the apparatus is changed from being in the second mode of operation when the apparatus is supported on the support surface to being in the first mode of operation when the apparatus is not supported on the support surface and to provide an indication when the position of the apparatus is changed from being in the second mode of operation when the apparatus is supported on the support surface to being in the first mode of operation when the apparatus is not supported on the support surface.

Preferably, the apparatus is a mobile computer, a PDA, a smart phone or a digital camera. Additionally or alternatively, the indication includes at least one of an audio alert, a visual alert, an SMS/MMS notification, an e-mail notification and a wireless notification.

In accordance with a preferred embodiment of the present invention defensive measures are initiated when the position of the apparatus is changed from being in the second mode of operation when the apparatus is supported on the support surface to being in the first mode of operation when the apparatus is not supported on the support surface, the measures including at least one of data encryption of data on the apparatus, data deletion of data on the apparatus and password protection of data on the apparatus.

Preferably, the apparatus is operative to at least one of initiate and terminate the anti-theft functionality in response to at least one of reading of a magnetic card, reading of a smart card, reading of an RFID tag, password entry, operation of a mechanical lock and biometric recognition. Additionally or alternatively, the apparatus is operative to terminate the indication in response to at least one of reading of a magnetic card, reading of a smart card, reading of an RFID tag, password entry, operation of a mechanical lock and biometric recognition.

There is also provided in accordance with another preferred embodiment of the present invention a portable electronic device including at least one audio signal transducer for emitting audio signals and receiving audio signals and including computer software embodied in a medium readable by the portable electronic device and having anti-theft functionality including learning functionality and theft-prevention functionality.

The learning functionality is operative to cause the portable electronic device to employ the at least one audio signal transducer to emit an audio signal and to receive an echo of the audio signal in a first mode of operation when the portable electronic device is not supported on the support surface, to cause the portable electronic device to employ the at least one audio signal transducer to emit an audio signal and to receive an echo of the audio signal in a second mode of operation when the portable electronic device is supported on the support surface, to perform a learning analysis of differences in magnitudes between the echo in the first mode of operation and the echo in the second mode of operation, to ascertain, based on the learning analysis, at least one frequency at which the difference in magnitudes between the echoes of the first and second modes of operation is significant and to employ the at least one audio signal transducer to emit an audio signal at the at least one frequency at which the difference in magnitudes between the echoes of the first and second modes of operation is significant and to receive an echo of the audio signal at the at least one frequency where the echo is a reference echo.

The theft-prevention functionality is operative to cause the portable electronic device to employ the at least one audio signal transducer to repeatedly emit an audio signal at the at least one frequency at which the difference in magnitudes between the echoes of the first and second modes of operation is significant and to receive an echo of the audio signal at the at least one frequency, repeatedly to perform a theft-prevention analysis of a difference in magnitudes between the echo and the reference echo at the at least one frequency at which the difference in magnitudes between the echoes of the first and second modes of operation is significant, to ascertain, based on the theft-prevention analysis, when the position of the portable electronic device is changed from being in the second mode of operation when the portable electronic device is supported on the support surface to being in the first mode of operation when the portable electronic device is not supported on the support surface and to provide an alarm indication when the position of the portable electronic device is changed from being in the second mode of operation when the portable electronic device is supported on the support surface to being in the first mode of operation when the portable electronic device is not supported on the support surface.

Preferably, the alarm indication includes at least one of an audio alert, a visual alert, an SMS/MMS notification, an e-mail notification and a wireless message notification. Additionally or alternatively, the device is operative to initiate and terminate the anti-theft functionality in response to at least one of reading of a magnetic card, reading of a smart card, reading of an RFID tag, password entry, operation of a mechanical lock and biometric recognition.

In accordance with a preferred embodiment of the present invention, the device is operative to terminate the alarm indication in response to at least one of reading of a magnetic card, reading of a smart card, reading of an RFID tag, password entry, operation of a mechanical lock and biometric recognition.

In accordance with a preferred embodiment of the present invention the transducer emits and receives signals at ultrasound frequencies.

There is further provided in accordance with another preferred embodiment of the present invention a method for preventing theft of an article, the method including fixedly associating with the article an electronic device including at least one audio signal transducer for emitting audio signals and receiving audio signals and including computer software embodied in a medium readable by the electronic device and having anti-theft functionality, operating the anti-theft functionality in a learning mode and operating the theft-prevention functionality in an anti-theft mode.

The learning mode includes causing the electronic device to employ the at least one audio signal transducer to emit an audio signal and to receive an echo of the audio signal in a first mode of operation when the electronic device is not supported on a support surface, causing the electronic device to employ the at least one audio signal transducer to emit an audio signal and to receive an echo of the audio signal in a second mode of operation when the electronic device is supported on the support surface, causing the electronic device to perform a learning analysis of differences in magnitudes between the echo in the first mode of operation and the echo in the second mode of operation, causing the electronic device to ascertain, based on the learning analysis, at least one frequency at which a difference in magnitudes between the echoes of the first and second modes of operation is significant and causing the electronic device to employ the at least one audio signal transducer to emit an audio signal at the at least one frequency at which the difference in magnitudes between the echoes of the first and second modes of operation is significant and to receive an echo of the audio signal at the at least one frequency where the echo is a reference echo.

The anti-theft mode includes causing the electronic device to employ the at least one audio signal transducer to repeatedly emit an audio signal at the at least one frequency at which the difference in magnitudes between the echoes of the first and second modes of operation is significant and to receive an echo of the audio signal at the at least one frequency, causing the electronic device repeatedly to perform a theft-prevention analysis of a difference in magnitudes between the echo and the reference echo at the at least one frequency at which the difference in magnitudes between the echoes of the first and second modes of operation is significant, causing the electronic device to ascertain, based on the theft-prevention analysis, when the position of the electronic device is changed from being in the second mode of operation when the electronic device is supported on the support surface to being in the first mode of operation when the electronic device is not supported on the support surface and causing the electronic device to provide an alarm indication when the position of the electronic device is changed from being in the second mode of operation when the electronic device is supported on the support surface to being in the first mode of operation when the electronic device is not supported on the support surface.

Preferably, the alarm indication includes at least one of an audio alert, a visual alert, an SMS/MMS notification, an e-mail notification and a wireless message notification. Additionally or alternatively, the transducer emits and receives signals at ultrasound frequencies.

BRIEF DESCRIPTION OF THE DRAWINGS

The present invention will be understood and appreciated more fully from the following detailed description, taken in conjunction with the drawings in which:

FIG. 2 is a simplified pictorial illustration of the operation of a position change sensing anti-theft device constructed and operative in accordance with a preferred embodiment of the present invention; and FIGS. 3A, 3B, 3C and 3D are flow charts illustrating details of the operation of a preferred embodiment of the anti-theft functionality.

DETAILED DESCRIPTION OF PREFERRED EMBODIMENTS

Figure 1:
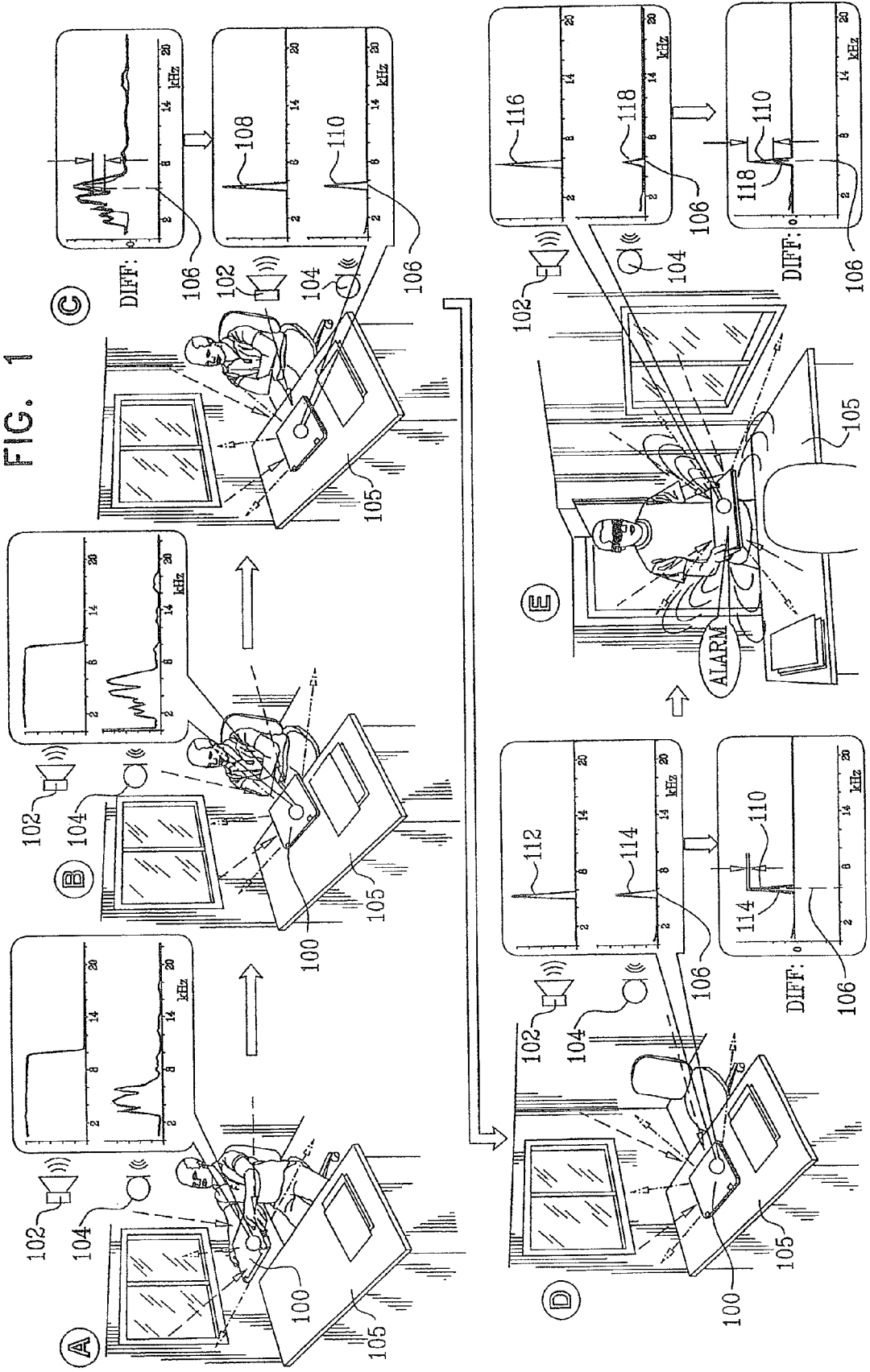
FIG. 1 is a simplified pictorial illustration of the operation of a portable electronic device including position change sensing anti-theft functionality constructed and operative in accordance with a preferred embodiment of the present invention.

Reference is now made to FIG. 1, which is a simplified pictorial illustration of the operation of a portable electronic device including position change sensing anti-theft functionality in accordance with a preferred embodiment of the present invention.

As seen in FIG. 1, there is provided a portable electronic device, in this case, a mobile computer 100 including at least one audio signal transducer for emitting audio signals and receiving audio signals, typically a built in speaker 102 and microphone 104. In accordance with a preferred embodiment of the present invention, there is also provided computer software embodied in a medium readable by the portable electronic device and having anti-theft functionality. The computer software may be in any suitable form and may be embodied in any suitable medium, such as software stored on a memory device, or incorporated in a computer chip which forms part of the portable electronic device or works together therewith. Alternatively, the software may be written on optical or magnetic media.

In accordance with a preferred embodiment of the present invention, the anti-theft functionality includes learning functionality and theft prevention functionality.

The learning functionality is preferably operative to cause the portable electronic device to employ the at least one audio signal transducer to emit an audio signal and to receive an echo of the audio signal in a first mode of operation when the portable electronic device is not supported on a support surface and in a second mode of operation when the portable electronic device is supported on the support surface.

The learning functionality performs a learning analysis of differences in magnitudes between the echoes and ascertains, based on the learning analysis, at least one frequency at which the difference in magnitudes between the echoes of the first and second modes of operation is significant.

The learning functionality is preferably operative to cause the portable electronic device to employ the at least one audio signal transducer to emit an audio signal at the at least one frequency and to receive a reference echo of the audio signal in a second mode of operation when the portable electronic device is supported on a support surface.

The theft-prevention functionality is preferably operative to cause the portable electronic device to employ the at least one audio signal transducer to repeatedly emit an audio signal at the at least one frequency and to receive an echo of the audio signal at the at least one frequency.

The theft-prevention functionality repeatedly performs theft-prevention analysis of a difference in magnitudes between the echo and the reference echo at the at least one frequency and ascertains, based on the theft-prevention analysis, when the position of the portable electronic device is changed from being in the second mode of operation to be in the first mode of operation and provides an alarm indication when the position of the portable electronic device is changed from being in the second mode of operation to be in the first mode of operation.

Turning specifically to FIG. 1, frame A shows operation of the learning functionality in a first mode of operation when a mobile computer 100 is raised from a desk 105 and frame B shows operation of the learning functionality in a second mode of operation when the mobile computer 100 is supported on the desk 105. In both cases, the learning functionality emits an audio signal via speaker 102 and receives an echo via microphone 104. As illustrated, the audio signal that is emitted in both the first and second mode of operation is preferably an identical multifrequency signal and the received echoes differ depending on whether the computer 100 is positioned on the desk 105 or raised from the desk 105.

Frame C illustrates learning analysis of the differences in magnitudes between the echoes in the first and second modes of operation and ascertaining, based on the learning analysis, at least one frequency at which the difference in magnitudes between the echoes of the first and second modes of operation is significant, here shown as peak frequency 106.

The learning functionality subsequently emits an audio signal 108 at the peak frequency 106 via speaker 102 and receives an echo 110 via microphone 104 in a second mode of operation when the personal computer 100 is supported on the desk 105. The received echo 110 is stored in the device as a reference echo for use as part of the theft-prevention functionality.

Frames D and E illustrate operation of the theft-prevention functionality. As seen in frame D, the computer 100 is supported on the desk 105 and employs the speaker 102 to emit a signal 112 at least the peak frequency 106 and employs the microphone 104 to receive an echo 114. Throughout operation of the theft-prevention functionality, theft-prevention analysis is repeatedly performed of a difference in magnitudes between the echo 114 received during the operation of the theft-prevention functionality and the reference echo 110 ascertained during the operation of the learning functionality.

As seen in frame E, the computer 100 is removed from the desk 105 as by an unauthorized person. The computer 100 employs the speaker 102 to emit a signal 116, as in frame D, and employs the microphone 104 to receive an echo 118, which is detectably different from the reference echo 110 ascertained during the operation of the learning functionality. It is thus ascertained that the position of the portable computer 100 is changed from being in the second mode of operation when it is supported on the desk 105 to be in the first mode of operation when it not supported on the desk 105.

When, as the result of the theft-prevention analysis, it is ascertained that the position of the mobile computer 100 is changed from being in the second mode of operation when it is supported on the desk 105 to be in the first mode of operation when it not supported on the desk 105, as illustrated in Frame E where an unauthorized person lifts the computer 100 from the desk 105, an alarm indication is provided.

The alarm indication may be any suitable alarm indication such as an audio and/or visually sensible alarm, a remote message, such as an email, SMS or wireless message notification using Bluetooth or other technology to an owner or to a security authority. The alarm indication may include encryption or password protection of all or part of the data stored on the computer or disabling all or part of the computer function and erasure of the contents of the memory of the computer.

Reference is now made to FIG. 2, which is a simplified pictorial illustration of the operation of a position change sensing anti-theft device constructed and operative in accordance with a preferred embodiment of the present invention. In this embodiment, the anti-theft device 201 may be integrated with, mounted on or placed inside an article, such as a briefcase 200 to be protected.

As seen in FIG. 2, there is provided a position change sensing anti-theft device 201, including at least one audio signal transducer for emitting audio signals and receiving audio signals, typically a speaker 202 and microphone 204. In accordance with a preferred embodiment of the present invention, the device also includes computer software having anti-theft functionality. In accordance with a preferred embodiment of the present invention, the anti-theft functionality includes learning functionality and theft prevention functionality.

The learning functionality is preferably operative to cause the anti-theft device to employ the at least one audio signal transducer to emit an audio signal and to receive an echo of the audio signal in a first mode of operation when the article to be protected is not supported on a support surface and in a second mode of operation when the article to be protected is supported on the support surface.

The learning functionality performs a learning analysis of differences in magnitudes between the echoes and ascertains, based on the learning analysis, at least one frequency at which the difference in magnitudes between the echoes of the first and second modes of operation is significant.

The learning functionality is preferably operative to cause the anti-theft device to employ the at least one audio signal transducer to emit an audio signal at the at least one frequency and to receive a reference echo of the audio signal in a second mode of operation when the portable electronic device is supported on the support surface.

The theft-prevention functionality is preferably operative to cause the anti-theft device to employ the at least one audio signal transducer to repeatedly emit an audio signal at the at least one frequency and to receive an echo of the audio signal at the at least one frequency.

The theft-prevention functionality repeatedly performs a theft-prevention analysis of differences in magnitudes between the echo and the reference echo at the at least one frequency and ascertains, based on the theft-prevention analysis, when the position of the article to be protected is changed from being in the second mode of operation to be in the first mode of operation and provides an alarm indication when the position of the article to be protected is changed from being in the second mode of operation to be in the first mode of operation.

Turning specifically to FIG. 2, frame A shows activation of the device 201 which is integrated with an article to be protected, such as a briefcase 200. Frame A also shows operation of the learning functionality of device 201 in a first mode of operation when briefcase 200 with integrated device 201 is raised from the floor and frame B shows operation of the learning functionality in a second mode of operation when the briefcase 200 with integrated device 201 is supported on the floor. In both cases, the learning functionality of device 201 emits an audio signal via speaker 202 and receives an echo via microphone 204. As illustrated, the audio signal that is emitted in both the first and second modes of operation is preferably an identical multifrequency signal and the received echoes differ depending on whether the briefcase 200 with integrated device 201 is positioned on the floor or raised from the floor.

Frame C illustrates learning analysis of differences in magnitudes between the echoes in the first and second modes of operation and ascertaining, based on the learning analysis, at least one frequency at which the difference in magnitude between the echoes of the first and second modes of operation is significant, here shown as peak frequency 206.

The learning functionality subsequently emits an audio signal 208 at the peak frequency via speaker 202 and receives an echo 210 via microphone 204 in a second mode of operation when the briefcase 200 with integrated device 201 is supported on the floor. The received echo 210 is stored in the device as a reference echo for use as part of the theft-prevention functionality.

Frames D and E illustrate operation of the theft-prevention functionality. As seen in frame D, the briefcase 200 with integrated device 201 is supported on the floor. Device 201 employs the speaker 202 to emit an audio signal 212 at least the peak frequency 206 and employs the microphone 204 to receive an echo 214. Throughout operation of the theft-prevention functionality, theft-prevention analysis is repeatedly performed of a difference in magnitudes between the echo 214 received during the operation of the theft-prevention functionality and the reference echo 210 ascertained during the operation of the learning functionality.

As seen in frame E, briefcase 200 with integrated device 201 is lifted from the floor as by an unauthorized person. The device 201 employs the speaker 202 to emit an audio signal 216, as in frame D, and employs the microphone 204 to receive an echo 218, which is detectably different from the reference echo 210 ascertained during the operation of the learning functionality. It is thus ascertained that the position of the briefcase 200 with integrated device 201 is changed from being in the second mode of operation when it is supported on the floor to being in the first mode of operation when it not supported on the floor.

When, as the result of the analysis, it is ascertained that the position of the briefcase 200 with integrated device 201 is changed from being in the second mode of operation when it is supported on the floor to being in the first mode of operation when it not supported on the floor, as illustrated in Frame E when an unauthorized person lifts the briefcase 200 with integrated device 201 from the floor, an alarm indication is provided.

The alarm indication may be any suitable alarm indication such as an audio and/or visually sensible alarm, a remote message, such as an email, SMS or wireless message notification using Bluetooth or other technology to an owner or to a security authority.

Reference is now made to FIGS. 3A, 3B, 3C, and 3D which are flow charts illustrating details of the operation of a preferred embodiment of the anti-theft functionality employed in the embodiments of FIGS. 1 and 2.

Figure 3A:
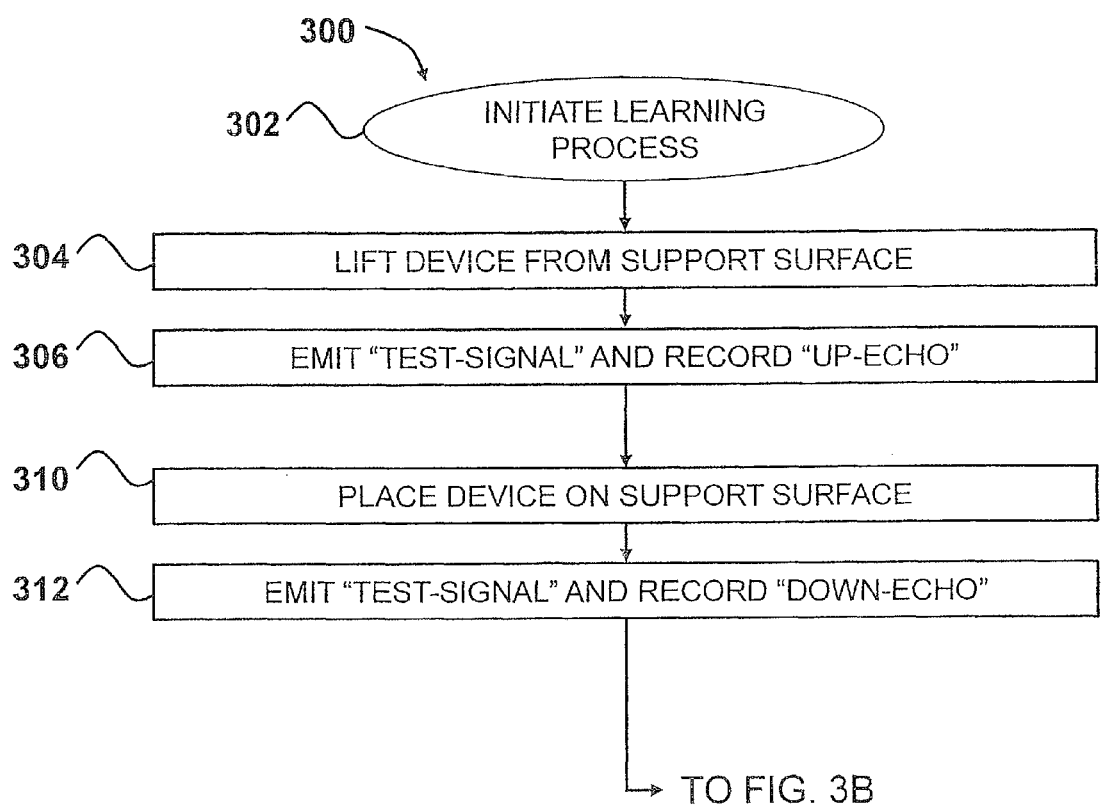

As shown in FIG. 3A, a learning functionality process 300 is initiated in an initial step 302 by an authorized user on the device to be protected such as mobile computer 100 or on an anti-theft device such as device 201 for integration with, insertion into or attachment to an item to be protected such as briefcase 200.

In a subsequent step 304 the device is lifted so that the device is not supported on the support surface. In a step 306 the learning process 300 is operative to cause the device to emit an audio signal, here labeled "test-signal" via a speaker, and record an echo received via a microphone. The emitted audio signal preferably corresponds to an audio template stored in a digital wave file in a medium readable by the device. The audio template describes a sine wave of constant amplitude and linearly increasing frequency calculated using the function:

$$F=\sin [2\pi f(t) \cdot t], f(t)=[t/(t_{max}-t_{min})] \cdot (f_{max}-f_{min})+f_{min}$$

where t is the current time within the time period starting at $t_{min}$ and ending at $t_{max}$, $f_{min}$ is the lowest frequency to be emitted and $f_{max}$ is the highest frequency to be emitted.

For example, if $f_{min}=0$ Hz, $f_{max}=10,000$ Hz, $t_{min}=0$ s, and $t_{max}=1$ s, F will equal $\sin(20,000\pi \cdot t^2)$.

The recorded echo is here labeled "up-echo". The recording of step 306 preferably includes conversion of the received echo signal into a digital wave file, describing signal amplitude as a function of time, which is saved in a medium readable by the device.

In a step 310 the device is placed on the support surface. In a step 312 the learning process 300 is operative to cause the device to emit an audio signal, here labeled "test-signal", via a speaker and record an echo received via a microphone. The emitted audio signal preferably corresponds to the same audio template file as described hereinabove. The recorded echo is here labeled "down-echo". The recording of step 312 preferably includes conversion of the received echo audio signal into a digital wave file, describing signal amplitude as a function of time, which is saved in a medium readable by the device.

Figure 3B:
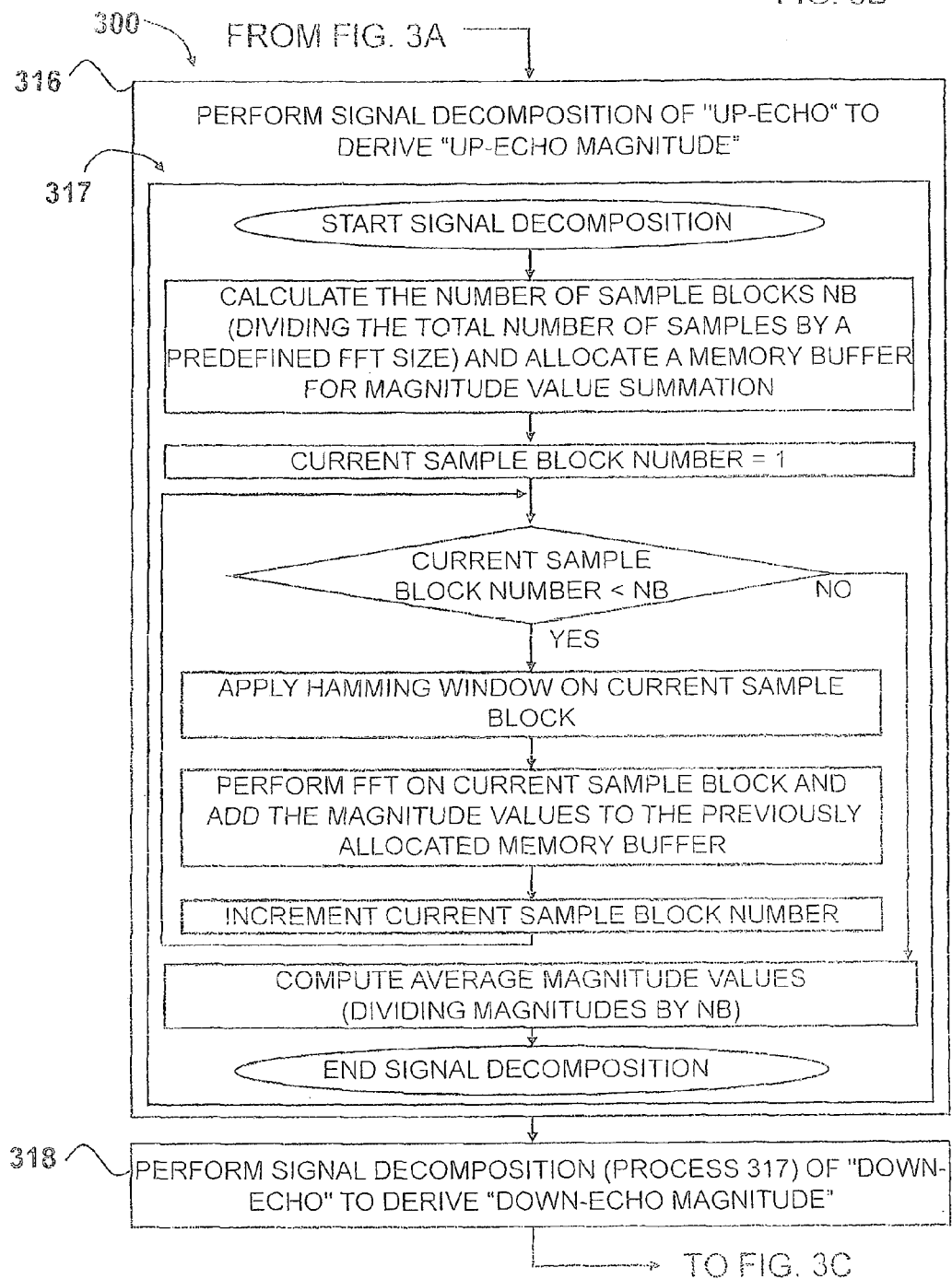

As shown in FIG. 3B, learning process 300 is then operative to perform a comparative analysis of the echoes recorded in steps 306 and 312. In step 316 signal decomposition is performed using a signal decomposition process 317 on the recorded echo of step 306. In step 318 signal decomposition is performed using signal decomposition process 317 on the recorded echo of step 312.

The signal decomposition process 317 is operative to change the representation of the recorded echoes of steps 306 and 312 from signal amplitude as a function of time to signal magnitude as a function of frequency. The result of signal decomposition performed on up-echo of step 306 is here labeled "up-echo magnitude". The result of signal decomposition performed on down-echo of step 312 is here labeled "down-echo magnitude". The signal decomposition process 317 uses a Fast Fourier Transform algorithm or any other suitable algorithm known in the art.

As shown in FIG. 3C, a vector of difference in magnitude as a function of frequency is then calculated in a step 319 by subtracting the down-echo magnitude, as ascertained in step 316, from the up-echo magnitude, as ascertained in step 318, within a predefined range of frequencies.

The vector is then analyzed in step 320 to ascertain the maxima where the difference between the echoes is most significant. Preferably one to five maxima are ascertained. In the descriptions of FIG. 1 and FIG. 2 hereinabove a single frequency is ascertained, such as peak frequency 106 and peak frequency 206 respectively. It is appreciated that the down-echo magnitude may be greater than the up-echo magnitude at the frequencies ascertained in step 320 or alternatively that the down-echo magnitude may be less than the up-echo magnitude at the frequencies ascertained in step 320.

In a subsequent step 322 the learning process 300 is operative to compose an audio file, here labeled "guard-signal", which is saved preferably as a digital wave audio file in a medium readable by the device. The guard-signal file generated in step 322 describes a sine function corresponding to each of the frequencies ascertained in step 320.

In a step 324 process 300 initiates a reference test of the guard-signal generated in step 322. Process 300 is operative to cause the device to emit an audio signal corresponding to the guard-signal of step 322 via a speaker, and record an echo received via a microphone. The recorded echo is here labeled "guard-echo". The recording of step 324 preferably includes conversion of the received echo audio signal into a digital wave file, describing signal amplitude as a function of time, which is saved in a medium readable by the device.

In a subsequent step 328 signal decomposition, as described hereinabove and using process 317, is performed on the recorded guard-echo of step 324 to change the representation of the recorded guard-echo from signal amplitude as a function of time to signal magnitude for each of the frequencies ascertained in step 320. In step 330 a magnitude value, here labeled "reference echo magnitude value", is calculated by summing the magnitudes ascertained in step 328 for each of the frequencies ascertained in step 320. Each magnitude at each of the frequencies ascertained in step 320 is preferably multiplied by a weighting factor, based on the functional contribution of the particular frequency, before being summed.

The reference echo magnitude value calculated in step 330, is saved in step 332 in a medium readable by the device for reference in the theft prevention process further described hereinbelow with reference to FIG. 3D. Following the completion of learning process 300 in step 334, the learning process 300 may preferably initiate the theft prevention process described hereinbelow with reference to FIG. 3D.

As shown in FIG. 3D, theft prevention functionality process 350 is initiated in step 352. Process 350 may be initiated by learning process 300 or by an authorized user on the device to be protected such as the mobile computer 100 or on an anti-theft device 201 integrated with, inserted into or attached to an item to be protected such as the briefcase 200.

In a subsequent step 354 theft prevention process 350 is operative to cause the device to emit an audio signal corresponding to the guard-signal of step 322 via a speaker and record an echo received via a microphone. The recorded echo is here labeled "active-echo". The recording of step 354 preferably includes conversion of the received active-echo audio signal into a digital wave file, describing signal amplitude as a function of time, which is saved in a medium readable by the device.

In a subsequent step 358 signal decomposition, as described hereinabove and using process 317, is performed on the recorded active-echo of step 354 to change the representation of the recorded active-echo from signal amplitude as a function of time to signal magnitude for each of the frequencies ascertained in step 320.

In a step 360 a magnitude value, here labeled "active echo magnitude value", is calculated by summing the magnitudes ascertained in step 358 for each of the frequencies ascertained in step 320. The magnitude at each of the frequencies ascertained in step 320 is preferably multiplied by a weighting factor, based on the functional contribution of the particular frequency, before being summed.

It should be appreciated that the active echo magnitude value should be within a predetermined range of the reference echo magnitude value ascertained in step 330 if the device has not been moved from the support surface.

In a step 361 a sensitivity factor, here labeled S, is defined that allows for noise and natural variations in the active echo magnitude value. In a step 362 of theft prevention process 350 the active echo magnitude value calculated in step 360, is compared to the reference echo magnitude value calculated in step 330 multiplied by the sensitivity factor of step 361. If it is ascertained that the active echo magnitude value is greater than the reference echo magnitude value then a step 364 is initiated and theft prevention process 350 is operative to cause an alarm indication. If it is ascertained that the active echo magnitude value is less than the reference echo magnitude value then step 364 is skipped and a step 366 is initiated.

Step 366 checks whether an authorized user has attempted to interrupt theft prevention process 350. The interruption may be by a suitable means of interruption such as password entry, key, combination lock, magnetic or smart card, or biometric means such as fingerprint or voice recognition. If process 350 is not interrupted by an authorized user then steps 354 to 366 are repeated.

Interruption of process 350 by an authorized user terminates theft prevention process 350 at a step 368.

It is appreciated that ultrasonic transducers may be employed where suitable to provide ultrasonic range audio signals.

It is a particular feature of the present invention that, as distinguished from conventional motion sensors, the apparatus of the present invention provides anti-theft protection even when a protected device is in motion prior to or during a theft attempt, such as in a railroad compartment.

It will be appreciated by persons skilled in the art that the present invention is not limited to what has been particularly shown and described hereinabove. Rather the scope of the invention includes both combinations and subcombinations of the various features described hereinabove as well as modifications and variations thereof which would occur to persons skilled in the art upon reading the foregoing description and which are not in the prior art.

The invention claimed is:

1. A position change sensing apparatus comprising:
   at least one audio signal transducer for emitting audio signals and receiving audio signals; and
   computer software embodied in a medium readable by said apparatus and having anti-theft functionality, said anti-theft functionality including:
      learning functionality operative:
         to employ said at least one audio signal transducer to emit an audio signal and to receive an echo of said audio signal in a first mode of operation when said apparatus is not supported on a support surface;
         to employ said at least one audio signal transducer to emit an audio signal and to receive an echo of said audio signal in a second mode of operation when said apparatus is supported on said support surface;

to perform a learning analysis of differences in magnitude in a frequency domain between said echo in said first mode of operation and said echo in said second mode of operation;

to ascertain, based on said learning analysis, at least one frequency at which a difference in magnitudes between said echoes of said first and said second modes of operation is significant, said at least one frequency at which a difference in magnitudes between said echoes of said first and said second modes of operation is significant being at least one frequency where a local maximum in said differences in magnitude in said frequency domain between said echoes of said first and said second modes of operation occurs; and to employ said at least one audio signal transducer to emit an audio signal at said at least one frequency at which the difference in magnitudes between said echoes of said first and said second modes of operation is significant and to receive a learning functionality echo of said audio signal at said at least one frequency, wherein said learning functionality echo is a reference echo; and theft-prevention functionality operative:

to cause said apparatus to employ said at least one audio signal transducer to repeatedly emit an audio signal at said at least one frequency at which the difference in magnitudes between said echoes of said first and said second modes of operation is significant and to receive a theft-prevention functionality echo of said audio signal at said at least one frequency;

repeatedly to perform a theft-prevention analysis of a difference in magnitudes between said theft-prevention functionality echo and said reference echo at said at least one frequency at which the difference in magnitudes between said echoes of said first and said second modes of operation is significant;

to ascertain, based on said theft-prevention analysis, when the position of said apparatus is changed from being in said second mode of operation when said apparatus is supported on said support surface to being in said first mode of operation when said apparatus is not supported on said support surface; and to provide an indication when the position of said apparatus is changed from being in said second mode of operation when said apparatus is supported on said support surface to being in said first mode of operation when said apparatus is not supported on said support surface.

2. A position change sensing apparatus according to claim 1 and wherein said apparatus is at least one of a mobile computer, a PDA, a smart phone and a digital camera.

3. A position change sensing apparatus according to claim 2 and wherein said indication includes at least one of an audio alert, a visual alert, an SMS/MMS notification, an e-mail notification and a wireless notification.

4. A position change sensing apparatus according to claim 2 and wherein defensive measures are initiated when the position of said apparatus is changed from being in said second mode of operation when said apparatus is supported on said support surface to being in said first mode of operation when said apparatus is not supported on said support surface, said measures including at least one of encryption of data on said apparatus, deletion of data on said apparatus and password protection of data on said apparatus.

5. A position change sensing apparatus according to claim 2 and wherein said apparatus is operative to at least one of initiate and terminate said anti-theft functionality in response to at least one of a biometric input, reading of a magnetic card, reading of a smart card, reading of an RFID tag, password entry and operation of a mechanical lock.

6. A position change sensing apparatus according to claim 2 and wherein said apparatus is operative to terminate said indication in response to at least one of a biometric input, reading of a magnetic card, reading of a smart card, reading of an RFID tag, password entry and operation of a mechanical lock.

7. A position change sensing apparatus according to claim 2 and wherein said transducer emits and receives signals at ultrasound frequencies.

8. A position change sensing apparatus according to claim 1 and wherein said indication includes at least one of an audio alert, a visual alert, an SMS/MMS notification, an e-mail notification and a wireless notification.

9. A position change sensing apparatus according to claim 1 and wherein defensive measures are initiated when the position of said apparatus is changed from being in said second mode of operation when said apparatus is supported on said support surface to being in said first mode of operation when said apparatus is not supported on said support surface, said measures including at least one of encryption of data on said apparatus, deletion of data on said apparatus and password protection of data on said apparatus.

10. A position change sensing apparatus according to claim 1 and wherein said apparatus is operative to at least one of initiate and terminate said anti-theft functionality in response to at least one of a biometric unit, reading of a magnetic card, reading of a smart card, reading of an RFID tag, password entry and operation of a mechanical lock.

11. A position change sensing apparatus according to claim 1 and wherein said apparatus is operative to terminate said indication in response to at least one of reading of a magnetic card, reading of a smart card, reading of an RFID tag, a biometric input, password entry and operation of a mechanical lock.

12. A position change sensing apparatus according to claim 1 and wherein said transducer emits and receives signals at ultrasound frequencies.

13. A portable electronic device including at least one audio signal transducer for emitting audio signals and receiving audio signals, said portable electronic device also comprising:

computer software embodied in a medium readable by said portable electronic device and having anti-theft functionality, said anti-theft functionality including:

learning functionality operative:

to cause said portable electronic device to employ said at least one audio signal transducer to emit an audio signal and to receive an echo of said audio signal in a first mode of operation when said portable electronic device is not supported on a support surface;

to cause said portable electronic device to employ said at least one audio signal transducer to emit an audio signal and to receive an echo of said audio signal in a second mode of operation when said portable electronic device is supported on said support surface;

to perform a learning analysis of differences in magnitude in a frequency domain between said echo in said first mode of operation and said echo in said second mode of operation;

to ascertain, based on said learning analysis, at least one frequency at which the difference in magnitudes between said echoes of said first and said second modes of operation is significant, said at least one frequency at which a differences in magnitude in said frequency domain between said echoes of said first and said second modes of operation is significant being at least one frequency where a local maximum in said difference in magnitudes between said echoes of said first and said second modes of operation occurs; and to employ said at least one audio signal transducer to emit an audio signal at said at least one frequency at which the difference in magnitudes between said echoes of said first and said second modes of operation is significant and to receive a learning functionality echo of said audio signal at said at least one frequency, wherein said learning functionality echo is a reference echo; and theft-prevention functionality operative:

to cause said portable electronic device to employ said at least one audio signal transducer to repeatedly emit an audio signal at said at least one frequency at which the difference in magnitudes between said echoes of said first and said second modes of operation is significant and to receive a theft-prevention functionality echo of said audio signal at said at least one frequency;

repeatedly to perform a theft-prevention analysis of a difference in magnitudes between said theft-prevention functionality echo and said reference echo at said at least one frequency at which the difference in magnitudes between said echoes of said first and said second modes of operation is significant;

to ascertain, based on said theft-prevention analysis, when the position of said portable electronic device is changed from being in said second mode of operation when said portable electronic device is supported on said support surface to being in said first mode of operation when said portable electronic device is not supported on said support surface; and to provide an alarm indication when the position of said portable electronic device is changed from being in said second mode of operation when said portable electronic device is supported on said support surface to being in said first mode of operation when said portable electronic device is not supported on said support surface.

14. A portable electronic device according to claim 13 and wherein said alarm indication includes at least one of an audio alert, a visual alert, an SMS/MMS notification, an e-mail notification and a wireless message notification.

15. A portable electronic device according to claim 13 and wherein said device is operative to initiate and terminate said anti-theft functionality in response to at least one of a biometric input, reading of a magnetic card, reading of a smart card, reading of an RFID tag, password entry and operation of a mechanical lock.

16. A portable electronic device according to claim 13 and wherein said device is operative to terminate said alarm indication in response to at least one of a biometric input, reading of a magnetic card, reading of a smart card, reading of an RFID tag, password entry and operation of a mechanical lock.

17. A portable electronic device according to claim 13 and wherein said transducer emits and receives signals at ultrasound frequencies.

18. A method for preventing theft of an article, the method comprising:

fixedly associating with said article an electronic device including at least one audio signal transducer for emitting audio signals and receiving audio signals and including computer software embodied in a medium readable by said electronic device and having anti-theft functionality;

operating said anti-theft functionality in a learning mode including:

causing said electronic device to employ said at least one audio signal transducer to emit an audio signal and to receive an echo of said audio signal in a first mode of operation when said electronic device is not supported on a support surface;

causing said electronic device to employ said at least one audio signal transducer to emit an audio signal and to receive an echo of said audio signal in a second mode of operation when said electronic device is supported on said support surface;

causing said electronic device to perform a learning analysis of differences in magnitudes in a frequency domain between said echo in said first mode of operation and said echo in said second mode of operation;

causing said electronic device to ascertain, based on said learning analysis, at least one frequency at which a difference in magnitudes between said echoes of said first and said second modes of operation is significant, said at least one frequency at which a difference in magnitudes between said echoes of said first and said second modes of operation is significant being at least one frequency where a local maximum in said differences in magnitude in said frequency domain between said echoes of said first and said second modes of operation occurs; and causing said electronic device to employ said at least one audio signal transducer to emit an audio signal at said at least one frequency at which the difference in magnitudes between said echoes of said first and said second modes of operation is significant and to receive a learning functionality echo of said audio signal at said at least one frequency, wherein said learning functionality echo is a reference echo; and operating said anti-theft functionality in a theft prevention mode including:

causing said electronic device to employ said at least one audio signal transducer to repeatedly emit an audio signal at said at least one frequency at which the difference in magnitudes between said echoes of said first and said second modes of operation is significant and to receive a theft-prevention functionality echo of said audio signal at said at least one frequency;

causing said electronic device repeatedly to perform a theft-prevention analysis of a difference in magnitudes between said theft-prevention functionality echo and said reference echo at said at least one frequency at which the difference in magnitudes between said echoes of said first and said second modes of operation is significant;

causing said electronic device to ascertain, based on said theft-prevention analysis, when the position of said electronic device is changed from being in said second mode of operation when said electronic device is supported on said support surface to being in said first mode of operation when said electronic device is not supported on said support surface; and causing said electronic device to provide an alarm indication when the position of said electronic device is changed from being in said second mode of operation when said electronic device is supported on said support surface to being in said first mode of operation when said electronic device is not supported on said support surface.

19. A method according to claim 18 and wherein said alarm indication includes at least one of an audio alert, a visual alert, an SMS/MMS notification, an e-mail notification and a wireless message notification.

20. A method according to claim 18 and wherein said transducer emits and receives signals at ultrasound frequencies.

* * * * *